United States Patent

[11] 3,623,745

| [72] | Inventor | Robert W. Taylor<br>P.O. Box 9355 Southern University, Baton Rouge, La. 70813 |
|---|---|---|
| [21] | Appl. No. | 829,581 |
| [22] | Filed | June 2, 1969 |
| [45] | Patented | Nov. 30, 1971 |

[54] LOAD LEVELER
5 Claims, 7 Drawing Figs.

| [52] | U.S. Cl. | 280/124, 296/1 |
|---|---|---|
| [51] | Int. Cl. | B60g 11/58 |
| [50] | Field of Search | 280/124 F; 296/1 S; 180/1.15 |

[56] References Cited
UNITED STATES PATENTS

| 3,013,811 | 12/1961 | Allinquant | 280/124 F |
|---|---|---|---|
| 3,083,033 | 3/1963 | Fiaca | 280/124 F |
| 3,455,594 | 7/1969 | Hall | 296/1 S |

FOREIGN PATENTS

| 822,334 | 11/1951 | Germany | 180/1.15 |
|---|---|---|---|

*Primary Examiner*—Philip Goodman
*Attorney*—Jones & Thomas

ABSTRACT: An automobile including in combination, a chassis, wheels rotatably supporting the chassis, and spring assemblies connected between the chassis and wheels. The spring assembly of each wheel comprises a spring connected at one of its ends to a wheel and an hydraulic ram connected between the other end of the spring and the chassis. A fluid displacement cylinder communicates with the rams and is carried by the chassis. The piston of the fluid displacement cylinder is connected to an air foil which creates a negative lift to apply a downward force on the piston which functions to add a simulated weight to the chassis and compress the springs of the wheel assemblies and to displace fluid from the fluid displacement cylinder to urge fluid to the rams to raise the chassis with respect to the springs. Thus, as the force exerted by the wing adds to the weight of the vehicle and causes contraction of the wheel springs, the chassis is maintained a predetermined distance from the ground by the rams.

INVENTOR
ROBERT W. TAYLOR
BY Jones & Thomas
ATTORNEYS

PATENTED NOV 30 1971
3,623,745
SHEET 2 OF 2
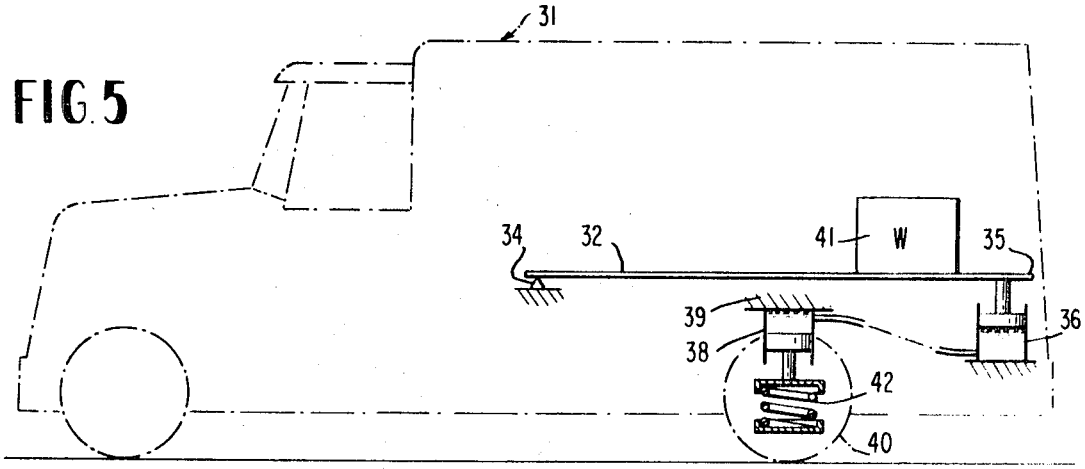
FIG.5
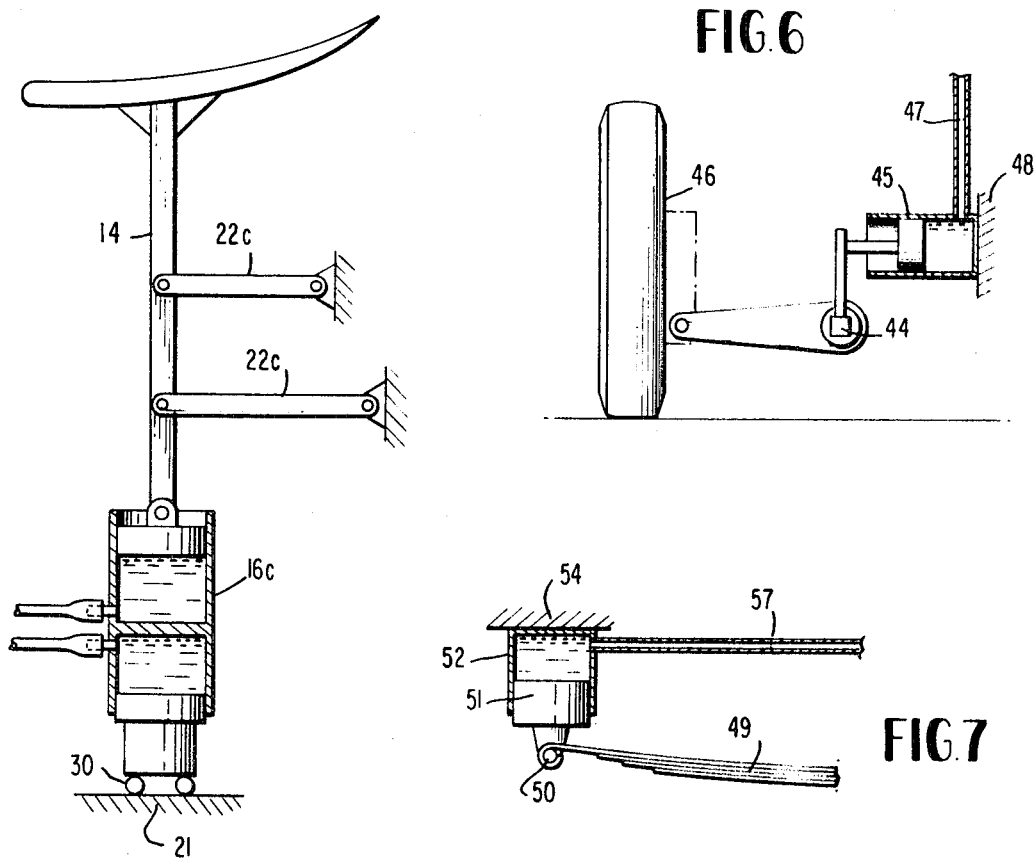
FIG.6
FIG.4
FIG.7
INVENTOR
ROBERT W. TAYLOR
BY *Jones & Thomas*
ATTORNEYS

LOAD LEVELER

BACKGROUND OF THE INVENTION

When the weight of an automobile or similar vehicle is increased the suspension springs between the chassis of the vehicle rides closer to the ground surface. Most vehicles are suspended at an optimum distance from the ground when carrying normal loads, and when a heavier load is applied to the vehicle, the lower configuration of the vehicle might subject it to damage due to road obstructions, or the like. Furthermore, the tires of the wheel assemblies of a vehicle are arranged so that the treads normally extend virtually flat against the road surface at the optimum road clearance of the vehicle. When the vehicle is lighter or heavier than the anticipated normal load, the tires and wheel assemblies assume a positive or negative camber, or a tilted attitude so that the tires engage the ground surface primarily on an edge. The camber of a wheel tends to reduce its even engagement with the ground surface and reduce the traction or friction with respect to the ground.

In the past, some racing vehicles have been constructed with racing wings or air foils which apply a negative lift force to the vehicle and effectively add to the weight of the vehicle. This extra downward force applied through the wing causes the wheels of the vehicle to engage the ground with more force, which results in more traction or friction between the wheels and the ground. This is a highly desirable condition for high-speed vehicles. Most of the wings carried by the racing vehicles have been attached to the chassis of the vehicle so that when high speeds were reached by the vehicle the chassis was urged closer to the road surface, reducing the clearance of the vehicle from the ground and creating a camber in the wheels. As a result, the suspension arrangement of the vehicle had to be modified, so that the vehicle was maintained at a higher road clearance at lower speeds and sunk to the optimum road clearance at high speeds with the added negative force from the wing. Of course, this is an undesirable arrangement during the lower speed ranges of the vehicle, and the vehicle would assume the optimum road clearance only during a small range of speeds, being above the optimum road clearance at a slightly slower speed and being below the optimum road clearance at a slightly higher speed. Thus, the previously utilized racing wings have been inefficient and somewhat dangerous when used at vehicle speeds which cause the vehicle to assume a road clearance other than optimum road clearance.

In a similar manner, when a load carrying vehicle is utilized to carry a load other than the optimum load for which the vehicle was constructed, similar road clearance and wheel traction problems are experienced. For instance, when a heavy load is carried in the rear of a station wagon or panel truck, the vehicle dips in the rear and rides at an angle. This affects the steering and other handling characteristics of the vehicle.

SUMMARY OF THE INVENTION

Briefly described, the present invention comprises a vehicle load leveler that causes a vehicle to assume an optimum road clearance and wheel camber under varying loads. A fluid displaceable ram is placed between each wheel assembly and the chassis of a vehicle, and when the rams expand they function to elevate the vehicle with respect to its wheels. A fluid displacement device communicates with the rams, and the additional weight applied to the vehicle is transmitted to the fluid displacement device, which functions to expand the rams and compensate for the depression of the suspension system of the vehicle so that the optimum road clearance and wheel camber is maintained. The fluid displacement device is actuated by a racing wing or a load platform.

Thus, it is an object of this invention to provide a vehicle load leveler which causes a vehicle to assume proper road clearance and wheel camber in spite of additional loads applied to the vehicle.

Another object of this invention is to provide a load leveler for use with a racing vehicle having a racing wing, which causes the vehicle to assume proper road clearance at all vehicle speeds and under varying loads from the racing wing.

Another object of this invention is to provide a suspension system for a vehicle which compensates for additional loads applied to the vehicle to maintain the wheels of the vehicle in full traction with the road surface.

Another object of this invention is to provide a vehicle load leveler which is inexpensive to construct and maintain, which functions automatically, and which maintains the wheels of the vehicle in optimum attitude with respect to the road surface to maintain full traction with the road surface.

Other objects, features and advantages of the present invention will become apparent upon reading the following specification, when taken in conjunction with the accompanying drawing.

BRIEF DESCRIPTION OF THE DRAWING

FIG. 4 is a partial side elevational view of yet another support arrangement for a racing wing.

FIG. 5 is a schematic side view showing of a vehicle load leveler utilized in a load carrying vehicle, with the vehicle being shown in dashed lines.

FIG. 6 is a partial schematic showing of the load leveler as applied to a torsion bar suspension system.

FIG. 7 is a partial schematic showing of the load leveler as applied to an elliptical spring suspension system.

DESCRIPTION OF THE PREFERRED EMBODIMENT

Figure 1:
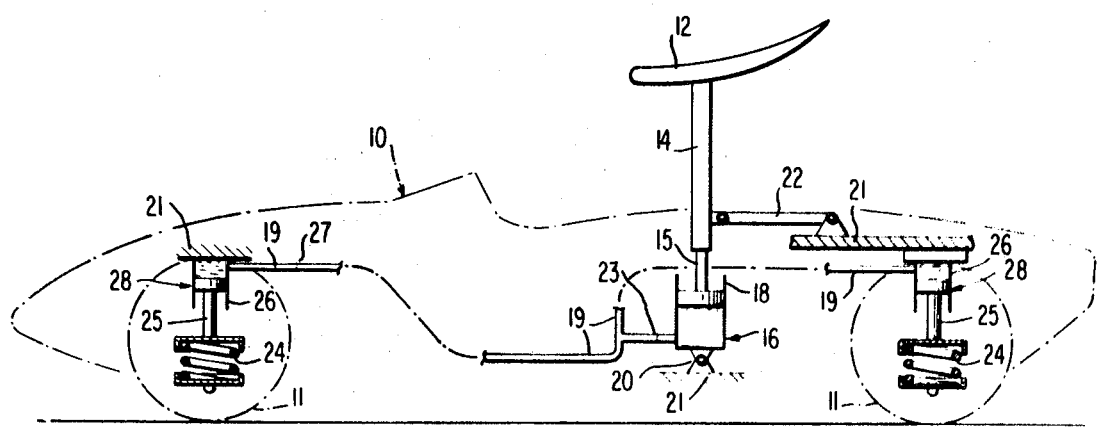
FIG. 1 is a schematic side view of the vehicle load leveler in conjunction with racing wing and a racing vehicle, with the vehicle shown in dashed lines.

Referring now in more detail to the drawing, in which like numerals indicate like parts throughout the several views, FIG. 1 shows racing vehicle 10 which includes wheel assemblies 11 and a racing wing or air foil 12. Wing 12 is of a configuration to exert a negative lift or downward force on vehicle 10. Strut 14 is connected to wing 12 at its midpoint and extends in a downward direction toward vehicle 10. The lower end of strut 14 terminates in piston 15 which is part of a fluid displacement system 16. Fluid displacement system 16 includes cylinder 18 which receives piston 15, and fluid flow lines 19 communicate with cylinder 18. Cylinder 18 is pivotally connected by means of swivel connection 20 to the frame or chassis 21 of vehicle 10. Strut 14 is connected to chassis 21 by means of link 22 which is pivotally connected at its ends between chassis 21 and strut 14. The arrangement of link 22 and swivel connection 20 is such that when wing 12 is moved in a downward direction it displaces the fluid in cylinder 18 and the angle of attack of wing 12 is modified.

Wheel assemblies 11 are of conventional construction in that they include the conventional axle arrangement at the rear and the conventional king pin and rotatable wheels at the front (not shown). Each wheel assembly has a coiled spring 24 as part of its suspension system, and the upper end of coiled spring 24 is connected to piston 25. Piston 25 is received in cylinder 26, which forms a ram or fluid displacement system 28. Fluid conduits 19 from fluid displacement system 16 communicate with rams 28, so that fluid displaced from fluid displacement system 16 functions to elongate rams 28. The upper ends of cylinders 26 are connected to chassis 21 of vehicle 10, so that the elongation of rams 28 results in a corresponding compression of springs 24 or a lifting of the chassis with respect to wheel assemblies 11. Similarly, when fluid displacement system 16 is expanded rams 28 are collapsed.

As previously mentioned, racing wing 12 can assume various angles of attack with respect to the flowing wind passing over the wing due to the movement of the vehicle. The configuration of wing 12 is such that a negative lift or downward force is applied to strut 14 which results in a displacement of piston 15 in cylinder 18 of fluid displacement system 16. This causes fluid to flow to rams 28, which results in an upward force exerted on chassis 21, or a lifting of the chassis with respect to springs 24. Of course, the downward force exerted by wing 12 will result in a foreshortening of springs 24 of wheel assemblies 11. The accumulative result will be such that the contraction of springs 24 will be compensated for by rams 28, to maintain chassis 21 at a virtually constant relationship with respect to wheel assemblies 11 and at an optimum road clearance.

As the vehicle increases its velocity, the flow of air across wing 12 will increase, and the negative lift of downward force exerted by the wing 12 will increase. This normally results in more displacement of fluid from fluid displacement system 16; however, as wing 12 displaces fluid from cylinder 18, the combined effected of link 22 and swivel connection 20 which support wing 12 is such that the angle of attack of wing 12 is modified. Link 22 is normally maintained in a horizontal attitude, but when wing 12 moves in a downward direction, the end of link 22 adjacent strut 14 moves below its opposite end, which results in a slight foreshortening of the effective lateral length of link 22. This tilts strut 14 in a backward direction with respect to the vehicle, so that the rear edge of the wing 12 is lowered with respect to the front edge. Thus, the angle of attack or attitude of wing 12 is modified to reduce the increase in negative lift. Therefore, the amount of negative lift created on the wing is limited, and the negative lift will not increase at a rate directly proportional to the increase in speed of the vehicle.

Figure 2:
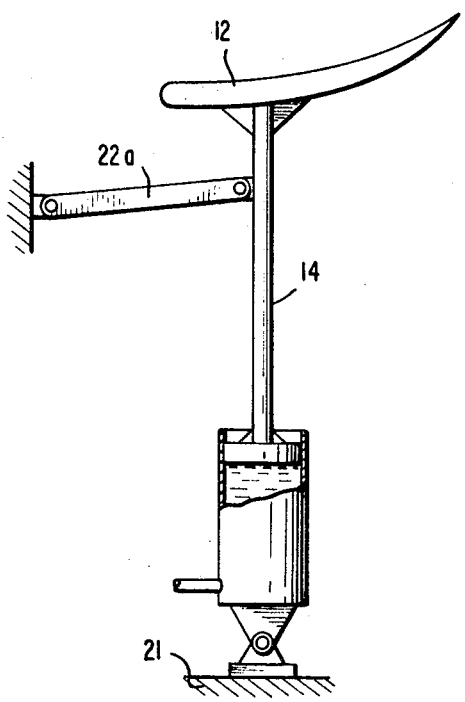
FIG. 2 is a partial side elevational view of a modified racing wing support structure.

As is best shown in FIG. 2, link 22 can be placed ahead of strut 14, by placing link 22a with its end attached to strut 14 at a level above its opposite end. With this arrangement, when wing 12 is moved in a downward direction, link 22a will become more level, which effectively increases the lateral length of link 22a and tilts strut 14 and wing 12 in a rearward direction to change the angle of attack of the wing.

Figure 3:
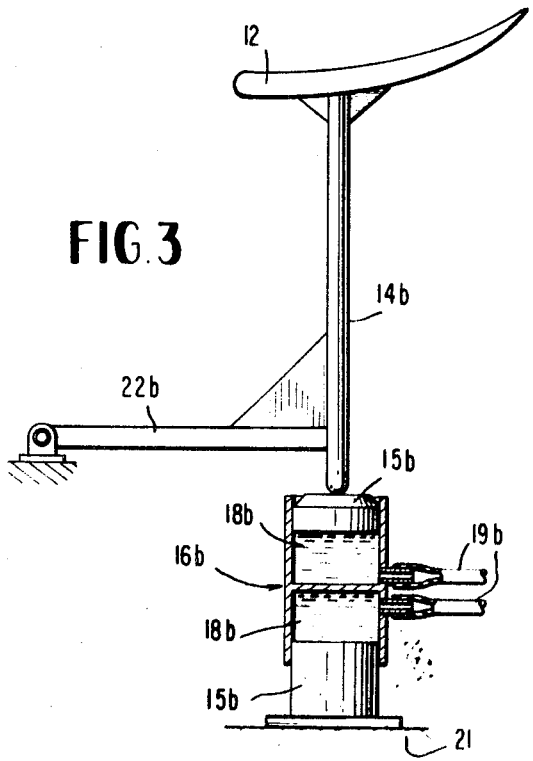
FIG. 3 is a partial side elevational view of another modification of the racing wing support structure.

FIG. 3 illustrates another modification of the wing support, wherein strut 14b is not directly attached to the piston of the fluid displacement system, but is rigidly connected to link 22b. When wing 12 is moved in a downward direction, it pivots about the pivotal end of link 22b, causing a change of angle of attack of the wing. Furthermore, fluid displacement system 16b of FIG. 3 is a tandem arrangement with a pair of cylinders 18b and a pair of pistons 15b. Fluid conduits 19b are connected to wheel assemblies on opposite sides of the vehicle, so that one conduit 19b is connected to rams 28 of the front and rear wheels on the right side of the vehicle, while the other conduit 19b is connected to the rams 28 of the wheels on the left side of the vehicle. With this arrangement any tendency of the vehicle to tilt due to overfilling the rams on one side of the vehicle will be resisted and the fluid flowing to and from the rams toward fluid displacement system 16 will not be able to flow back and forth between individual ones of rams 28 disposed on the opposite sides of the vehicle.

FIG. 4 shows another modified wing support system wherein a pair of generally parallel links 22c are connected to strut 14. The upper link is shorter than the lower link, so that a downward movement of strut 14 results in a backward tilting of the strut and the wing. Since the linkage arrangement is such that the bottom end of strut 14 will have some lateral movement, rollers or slides 30 will be provided and placed between fluid displacement system 16c and chassis 21.

As is shown in FIG. 5, a load-carrying vehicle 31 includes a load-carrying platform 32 in its rear portion. Platform 32 is pivotally supported at 34, or at its forward edge. The rear edge 35 is supported by fluid displacement system 36. Rams 38 are connected to the rear wheel assemblies of the vehicle in a manner similar to the connection of ram 28 to its wheel assemblies. Ram 38 communicates with fluid displacement system 36, and functions to elevate chassis 39 of the vehicle with respect to springs 42. Since the load or weight 41 carried by vehicle 31 will normally be located at the rear portion of the vehicle, it may be desirable to have the load leveler system connected only to the rear wheel assemblies.

When weight 41 is placed on platform 32, platform 32 pivots about its forward edge 34, and its rear edge 35 tends to displace fluid from fluid displacement system 36 toward ram 38 causing rams 38 to lift chassis 39 with respect to springs 42. Of course, when load 41 is placed upon load platform 32, springs 42 will be contracted to accommodate the increased weight of the vehicle. Therefore, the load leveler system functions to compensate for the contraction of springs 42, to maintain vehicle 31 at optimum road clearance.

As weight 41 is moved toward the forward portion of vehicle 31, its weight will be born more and more by front wheel assemblies 40, so that it is less and less necessary to lift the rear portion of the chassis with respect to the rear springs. Because of the manner in which platform 32 is supported, the weight felt by fluid displacement system 36 will decrease as weight 41 is moved toward the forward portion of the vehicle, and the tendency to lift the rear portion of the chassis is reduced. Conversely, when weight 41 is moved toward the rear of the vehicle, it becomes more and more effective to displace fluid from fluid displacement system 36, and lift the chassis with respect to the springs. Thus, the position of weight 41 over the surface of platform 32 determines the force exerted on fluid displacement system 36 and the resulting fluid pressure actuating rams 38.

While the invention disclosed to this point has been set forth in combination with coiled spring suspension systems, it is adaptable also to torsion bar suspension systems and elliptical spring suspension systems, as shown in FIGS. 6 and 7. Torsion bar 44 is arranged to engage ram 45, so that the fluid displacement system (not shown) expands ram 45 to pivot torsion bar 44, which results in a corresponding downward movement of wheel assembly 46 with respect to chassis 48. With respect to the elliptical spring suspension system as shown in FIG. 7, elliptical spring 49 has its spring hanger 50 connected to piston 51 of ram 52. With this arrangement, the fluid displaced from fluid displacement system (not shown) moves spring hanger in a downward direction with respect to chassis 54, which elevates chassis 54 with respect to spring 49.

When the wheel assemblies of the vehicle engage a bump and vibrate with respect to the chassis, the fluid in the rams of the load leveler will tend to surge from the rams back toward the fluid displacement system or from one ram to another. In order to prevent the surging of fluid in the system from changing the attitude of the vehicle the flow of fluid is restricted by the placement of flow restricters 23 (FIG. 1) adjacent the fluid displacement system 16, or the placement of flow restricters 27, 47, or 57 (FIGS. 1, 6, or 7) adjacent the rams of the suspension system. Furthermore, the conduits 19 utilized to transmit the fluid from fluid displacement system 16 toward rams 28 can be of a small internal diameter, which further tends to restrict the fluid surging in the system.

At this point, it should be obvious that the reduced road clearance and increased wheel camber caused by an additional load applied to a vehicle can be compensated for by the use of the disclosed invention. While in a racing vehicle it is desirable to utilize an effective increased vehicle weight to insure positive traction with the road surface, the additional weight which ordinarily reduces the road clearance and increases wheel camber of the vehicle can be effective to compensate for suspension spring contraction and maintain the vehicle at its optimum road clearance. When the racing wing is the device utilized to apply the additional effective weight to the vehicle, the effective negative lift or downward force exerted by the wing is increased upon the increase of air the wing changes its angle of attack or attitude as it moves in a downward direction, so that its increased negative lift does not increase directly in proportion to the increase in vehicle speed, and is limited. This prevents inadvertent excessive negative lift, and a prescribed negative lift is applied for a given wind velocity or vehicle speed.

While the invention has been disclosed as embodying a fluid displacement system, it will be understood that either an hydraulic or pneumatic system can be utilized in the embodiments set forth. Furthermore, while this invention has been described in detail with particular reference to preferred embodiments thereof, it will be understood that variations and modifications can be effected within the spirit and scope of the invention as described hereinbefore and as defined in the appended claims.

I claim:

1. An automotive vehicle including in combination a chassis, wheel assemblies rotatably supporting said chassis, and spring assemblies connected between said chassis and said wheel assemblies, each of said spring assemblies comprising a spring member connected at one of its ends to a wheel assembly and expandable and contractable in response to the vertical movement of its wheel assembly with respect to said chassis, a fluid displaceable ram member connected between the other end of said spring member and said chassis, fluid displacement means carried by said chassis and communicating with the ram member of the wheel assemblies whereby the fluid displacement means transmits fluid pressure to the ram members and the ram members expand to raise the chassis with respect to the spring members, and an air foil member connected to said fluid displacement means, said air foil being of a configuration to create a downward force on said chassis and to actuate said fluid displacement means.

2. In an automobile including a chassis, wheels, and laterally extending air foil attached to said chassis, said air foil being of a configuration to exert a downward force when moving with the automobile at a speed to create a wind flow across the surfaces of the air foil, the improvement therein comprising first expandable fluid displacement means connected to said air foil and chassis and responsive to the downward force exerted by the air foil to contract and displace a portion of its fluid, second expandable fluid displacement means communicating with said first fluid displacement means and positioned between the wheels and the chassis of the automobile and arranged to elevate the chassis with respect to the wheels when expanded.

3. The invention of claim 2 and further including springs connected between each wheel and said chassis, and wherein said second expandable fluid displacement means is positioned between said springs and said chassis.

4. The invention of claim 2 and further including means for varying the angle of attack of said air foil in response to the fluid displaced from said first fluid displacement means.

5. The invention of claim 2 wherein said second expandable fluid displacement means comprises an expandable ram in series with a spring member at each wheel of the automobile and wherein said first expandable fluid displacement means comprises a first expandable piston-cylinder means communicating with the expandable rams on one side of the automobile and a second expandable piston-cylinder means communicating with the expandable rams on the other side of the automobile.

* * * * *